US012802959B2

(12) United States Patent
Mordehai et al.

(10) Patent No.: US 12,802,959 B2
(45) Date of Patent: Nov. 17, 2026

(54) ION SOURCE FOR MASS SPECTROMETER

(71) Applicant: AGILENT TECHNOLOGIES, INC., Santa Clara, CA (US)

(72) Inventors: Alexander Mordehai, Santa Clara, CA (US); Ge Yu, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 341 days.

(21) Appl. No.: 18/439,597

(22) Filed: Feb. 12, 2024

(65) Prior Publication Data

US 2025/0079146 A1 Mar. 6, 2025

Related U.S. Application Data

(60) Provisional application No. 63/535,859, filed on Aug. 31, 2023.

(51) Int. Cl.

| | |
|---|---|
| ***H01J 49/06*** | (2006.01) |
| ***G01N 30/72*** | (2006.01) |
| ***H01J 49/14*** | (2006.01) |
| *G01N 30/02* | (2006.01) |

(52) U.S. Cl.

CPC ........ *H01J 49/067* (2013.01); *G01N 30/7206* (2013.01); *H01J 49/147* (2013.01); *G01N 2030/025* (2013.01)

(58) Field of Classification Search

CPC ........................... G01N 30/7206; H01J 49/067

See application file for complete search history.

(56) References Cited

U.S. PATENT DOCUMENTS

| | | | |
|---|---|---|---|
| 3,371,204 A | 2/1968 | Brubaker | |
| 5,313,061 A | 5/1994 | Drew et al. | |
| 5,663,560 A | 9/1997 | Sakairi et al. | |
| 6,005,245 A | 12/1999 | Sakairi et al. | |
| 6,177,668 B1 | 1/2001 | Hager | |
| 6,717,139 B2 | 4/2004 | Taniguchi | |
| 6,914,242 B2 | 7/2005 | Mordehai | |
| 7,183,542 B2 | 2/2007 | Mordehai | |
| 7,211,788 B2 | 5/2007 | Marriott | |
| 7,372,042 B2 | 5/2008 | Mordehai et al. | |
| 7,629,575 B2 * | 12/2009 | Wells .................... | H01J 49/067 250/281 |

(Continued)

FOREIGN PATENT DOCUMENTS

| | | |
|---|---|---|
| EP | 902963 B1 | 9/2002 |
| EP | 771019 B1 | 8/2003 |

(Continued)

OTHER PUBLICATIONS

International Search Report and Written Opinion—KIPO—International Application No. PCT/US2024/033919—mailed Oct. 7, 2024.

*Primary Examiner* — Erika J. Villaluna

(57) ABSTRACT

In some examples, an apparatus may include an ion source including at least one lens that is partitioned by at least one partition into at least two lens partitions. The at least two lens partitions may be connectable to a direct current (DC) bias power supply to bias the at least two lens partitions and a radio frequency alternating current (RF AC) voltage power supply to produce a dipolar RF field within the at least one lens.

20 Claims, 5 Drawing Sheets

(56) References Cited

U.S. PATENT DOCUMENTS

| | | | |
|---|---|---|---|
| 7,633,059 B2 * | 12/2009 | Russ, IV | H01J 49/004 250/281 |
| 7,960,690 B2 | 6/2011 | Schwartz et al. | |
| 9,117,617 B2 | 8/2015 | Russ et al. | |
| 9,324,547 B2 | 4/2016 | Hauschild et al. | |
| 9,698,002 B2 | 7/2017 | Hauschild et al. | |
| 10,593,525 B2 | 3/2020 | Hock et al. | |
| 10,699,888 B2 | 6/2020 | Giannakopulos et al. | |
| 10,790,131 B2 | 9/2020 | Amirav et al. | |
| 11,024,491 B2 | 6/2021 | Giannakopulos et al. | |
| 11,131,655 B2 | 9/2021 | Thoeing et al. | |
| 11,293,898 B2 | 4/2022 | Prasad et al. | |
| 11,515,138 B2 | 11/2022 | Nolting et al. | |
| 11,515,139 B2 | 11/2022 | Lange et al. | |
| 2007/0084998 A1 | 4/2007 | Franzen et al. | |
| 2017/0110286 A1 | 4/2017 | Chang et al. | |
| 2020/0066476 A1 | 2/2020 | De Castro et al. | |
| 2021/0225627 A1 | 7/2021 | Xuan et al. | |
| 2022/0130654 A1 | 4/2022 | Wysocki et al. | |
| 2022/0157584 A1 | 5/2022 | Giannakopulos et al. | |
| 2022/0254618 A1 | 8/2022 | Guna | |
| 2023/0098543 A1 | 3/2023 | Lange | |

FOREIGN PATENT DOCUMENTS

| | | |
|---|---|---|
| JP | 2011-065969 A | 3/2011 |
| WO | 2020021255 A1 | 1/2020 |
| WO | 2020054013 A1 | 3/2020 |

* cited by examiner

ION SOURCE FOR MASS SPECTROMETER

RELATED APPLICATIONS

The present application claims the benefit of U.S. Provisional Application No. 63/535,859, filed on Aug. 31, 2023, the disclosure of which is hereby incorporated by reference in its entirety.

BACKGROUND

Ion sources for mass spectrometry may include devices that produce ions out of sample neutral molecules, which may result in a charged beam in a vacuum suitable for subsequent mass spectral analysis. Ion sources may often generate ions from sample molecules of interest, as well ions from carrier media that may include carrier gas or liquid used to deliver a sample into the ion source.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
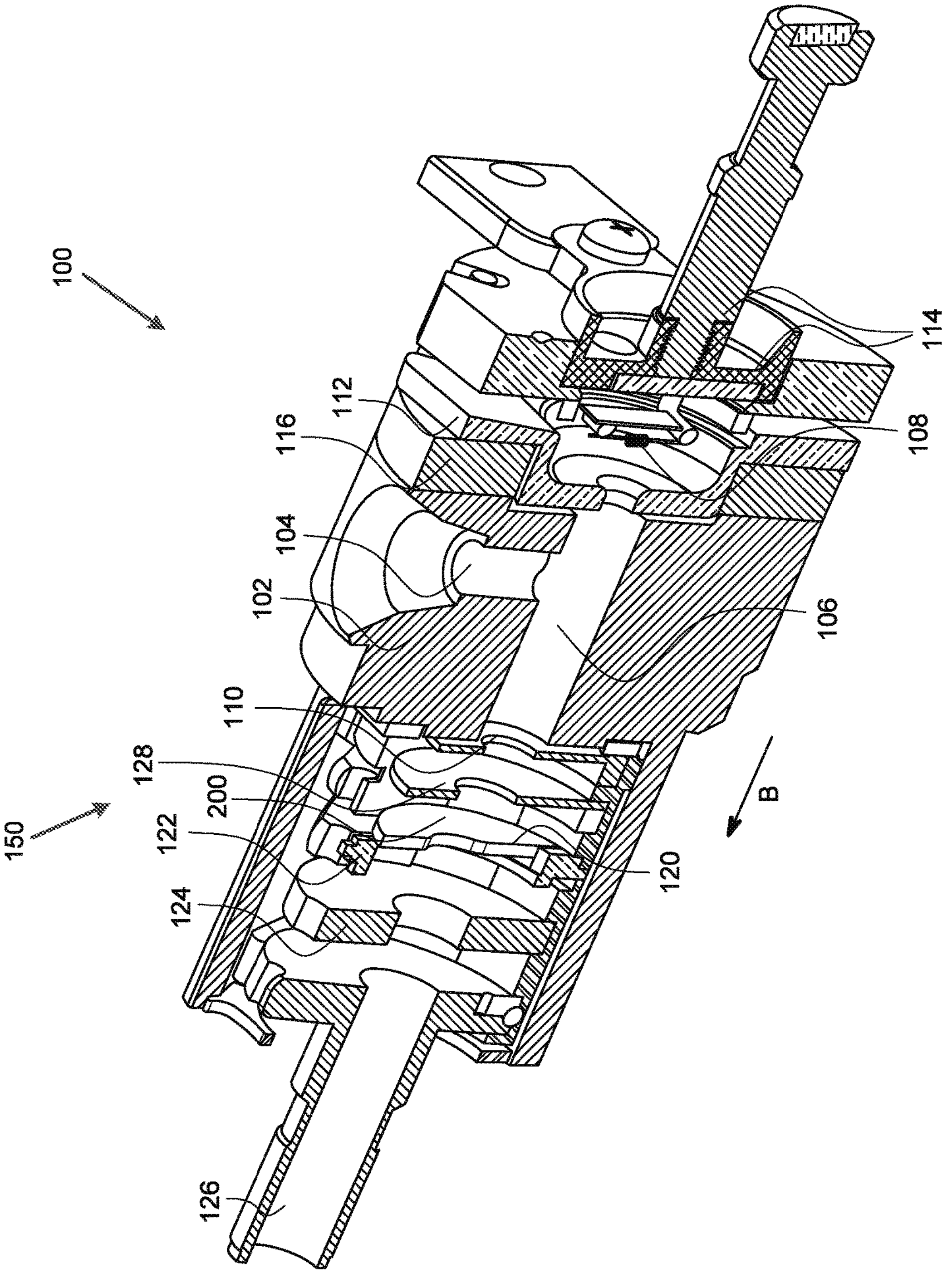
FIG. 1 illustrates a cutout view of a layout of an ion source apparatus for a mass spectrometer, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

An ion source apparatus for a mass spectrometer is disclosed herein, and eliminates carrier ions earlier in their ion optical path. The elimination of carrier ions earlier in their ion optical path minimizes an associated physical effect on a mass analyzer, and thus also decreases noise associated with a carrier gas.

With respect to ion sources for mass spectrometry, for trace analysis, ion generation from carrier media may exceed the concentration of ions from a sample, which may limit detection and ultimate sensitivity. Another issue with carrier media ions is associated with the premature aging of hardware due to ion burns that may be produced on ion optical elements or their supportive insulator structures. For example, when chromatography is combined with mass spectrometry (e.g., gas chromatography-mass spectrometry (GC-MS)), the carrier media, which may be Helium gas, may produce Het ions with a molecular weight of 4 Da, while sample organic molecules may have relatively higher molecular weight and are analyzed by a quadrupole mass analyzer. The concentration of He ions in an ion beam near the mass spectrometry analyzer may be several orders of magnitude higher compared to the sample ions. This ion beam may be highly dominated with He ions. The He ions may be ejected in the beginning of the quadrupole mass analyzer, thus producing ion burns and metal ablation areas on the mass analyzer. The ion burns and metal ablation may potentially damage hardware and produce contaminations. The ion burns and metal ablation may also result in the production of neutral metastable He, which may contribute to the noise level in a low-level and trace sample analysis.

An example of an ion source may include a Nier type where sample molecules in the gas phase are delivered into the ionization chamber by a carrier gas such as He, and ionized by an electron beam collimated by a magnetic field, B. The resulting ions may be extracted in a perpendicular direction to an e-beam producing a beam of a sample ion and carrier gas ions. Due to the presence of the magnetic field in the Nier sources, He may be diverted from the main beam due to its small mass, thus producing a burn mark on one of the exit lenses while the sample ion beam is exiting the ion source with substantially attenuated He ion abundance.

For the ion source apparatus for a mass spectrometer as disclosed herein, with respect to Nier type ion sources, the operation of the Nier type ion source may be limited for trace analyses due to compromised ion generation efficiency. The main ion beam may be perpendicular to an electron beam with a small intersecting area, and thus the sample ionization area may be relatively small, which may limit the ion production from the sample molecules, as well as sensitivity of a mass spectrometer with this type of ion source.

In one example, an ion optical device that may be part of a quadrupole mass analyzer may include four rods aligned with four quadrupole mass analyzer rods, but include a quadrupole symmetry alternating current (AC) field applied to them while a direct current (DC) component of the quadrupole field would not be applied. This example of the ion optical device may be used to enhance ion transmission for ions of interest going through the quadrupole mass filter. This example of the ion optical device may also eject light carrier gas ions within the stubbiest region. However, the RF field causing the carrier gas ejection may have the same symmetry as the main quadrupole mass analyzer (e.g., quadrupole symmetry with zero radial field directly on the axis of the device), thus making it inefficient and requiring a substantial length to achieve significant ion discrimination. This ion optical device may also be limited by its direct proximity to the mass analyzer, which limits flexibility of the ion optical design. Yet further, ejection of carrier gas ions directly in front of the main mass analyzer may counteract the purpose of removing metastable neutrals and contamination, since all of the excited neutrals from the quenched ions are essentially within the mass analyzer region, and the contamination flux is not partitioned from the main quadrupole mass analyzer.

In another example, in order to overcome the limitations of the Nier type ion sources, an ion beam, an electron beam, and a collimating magnetic field may be aligned with each other to thus produce improved ionization efficiency compared to Nier type ion sources. In this example however, the main ion beam may have both sample ions and carrier gas ions (such as Helium or hydrogen). The presence of the carrier gas ions in the main ion beam at substantial abundance may produce undesirable ion burns as the ion beam is dispersed in the mass analyzer, potentially damaging hardware as well as producing metastable uncharged particles that contribute to a noise baseline and decreasing the ultimate sensitivity of the technique.

The ion source apparatus for a mass spectrometer as disclosed herein may address at least the aforementioned limitations by providing an ion source with high ionization efficiency for sample molecules, while substantially eliminating the carrier gas ions out of the sample beam.

According to examples disclosed herein, an apparatus may include an ion source including at least one lens. The at least one lens may be partitioned by at least one partition into at least two lens partitions. The at least two lens partitions may be connectable to a direct current (DC) bias power supply to bias the at least two lens partitions and a radio frequency alternating current (RF AC) voltage power supply to produce a dipolar RF field (e.g., opposite phases of RF to each lens partition) within the at least one lens. In one example, the at least one lens may be symmetrically partitioned by the at least one partition into at least two symmetrical lens partitions. In another example, the at least one lens may be asymmetrically partitioned by the at least one partition into at least two asymmetrical lens partitions. A partitioned lens insulator mounting spacer may be disposed between the at least one lens and an adjacently disposed further lens. The at least two lens partitions may include a central opening in the at least one partition. In one example, the central opening may be circular. In another example, the central opening may be non-circular. The at least one lens may include a lowest ion energy compared to at least one other lens of the ion source.

According to examples disclosed herein, a method may include connecting, for an ion source that includes at least one lens including at least two lens partitions, the at least two lens partitions to a direct current (DC) bias power supply to bias the at least two lens partitions and a radio frequency alternating current (RF AC) voltage power supply to produce a dipolar RF field within the at least one lens. The method may further include optimizing, for the ion source, a lens RF frequency to remove ions that are produced by a gas chromatography (GC) carrier gas (such as hydrogen and helium, for example).

According to examples disclosed herein, an apparatus may include a source (e.g., an ion source, or a vacuum ion optics source) including at least one lens. The at least one lens may be partitioned by at least one partition into at least two lens partitions. The at least two lens partitions may be connectable to direct current (DC) and alternating current (AC) power supplies. In this regard, the at least two lens partitions may be connectable to a radio frequency (RF) drive, and further connectable to a direct current (DC) bias voltage.

According to examples disclosed herein, for the ion source apparatus for a mass spectrometer as disclosed herein, a lens element may be partitioned within the ion source into two halves. The lens element may be connected to an RF drive as well as a DC bias voltage to eliminate undesirable ions, while substantially preserving transmission for the ions of interest.

According to examples disclosed herein, for the ion source apparatus for a mass spectrometer as disclosed herein and for the lens element that is partitioned within the ion source into two halves, the ion source may be connected to an RF drive in a dipole configuration, as well as a DC bias voltage to eliminate undesirable ions while substantially preserving transmission for the ions of interest.

According to examples disclosed herein, for the ion source apparatus for a mass spectrometer as disclosed herein, frequency and voltage may be optimized for the RF drive to further attenuate undesirable ions to a target attenuation ratio.

According to examples disclosed herein, for the ion source apparatus for a mass spectrometer as disclosed herein, the partitioned lens and related aspects may also be utilized in vacuum ion optics where attenuation of specific light ions is needed.

According to examples disclosed herein, for the ion source apparatus for a mass spectrometer as disclosed herein, with respect application of the RF field in a dipolar manner to the partitioned lens, the lens may be partitioned to include symmetrical lens parts or non-symmetrical lens parts.

According to examples disclosed herein, for the ion source apparatus for a mass spectrometer as disclosed herein, a lens including the lowest ion energy may be partitioned to improve attenuation efficiency. However, other lenses that do not include the lowest ion energy may also be partitioned to improve attenuation efficiency.

According to examples disclosed herein, for the ion source apparatus for a mass spectrometer as disclosed herein, the RF on the partitioned lens may be selected so that it is not a multiple of the quad frequency and not phase locked. However, in some implementations, these two frequencies may be phase locked.

According to examples disclosed herein, for the ion source apparatus for a mass spectrometer as disclosed herein, an RF amplitude may be adjusted on the partitioned lens as a function of the mass of interest in the ion beam such that for smaller mass-to-charge ratio (m/z) values, a smaller amplitude may be used, while for larger m/z values, the RF amplitude may be increased to further maximize transmission for the ions of interest while still achieving substantial discrimination in undesirable ions such as carrier ions.

FIG. 1 illustrates a cutout view of a layout of an ion source apparatus for a mass spectrometer (hereinafter also referred to as "apparatus 100"), in accordance with an example of the present disclosure.

Referring to FIG. 1, the apparatus 100 may include an ion source 150 including an ion source body 102. A port 104 may be utilized for a gas chromatography sample loading transfer line. The apparatus 100 may further include an internal ion source volume 106 to receive a sample, electron ionization filament 108 for ionizing the sample, and extraction lenses 110 and 128 to extract ions towards a mass spectrometer. Further features of the apparatus 100 may include an ion repeller 112, filament mounting hardware 114, repeller insulator 116, yet another lens such as a partitioned lens 200 (e.g., also denoted extraction/partitioned lens for extracting/focusing ions towards the mass spectrometer), a lens partition 120 of the partitioned lens 200 (e.g., see FIG. 2), partitioned lens insulator mounting spacer 122, ion focus lens 124, and entrance lens 126. The ion volume may be situated into an axial magnetic field illustrated by arrow B. The axial magnetic field may focus and collimate both the electron and the ion beam.

Figure 2:
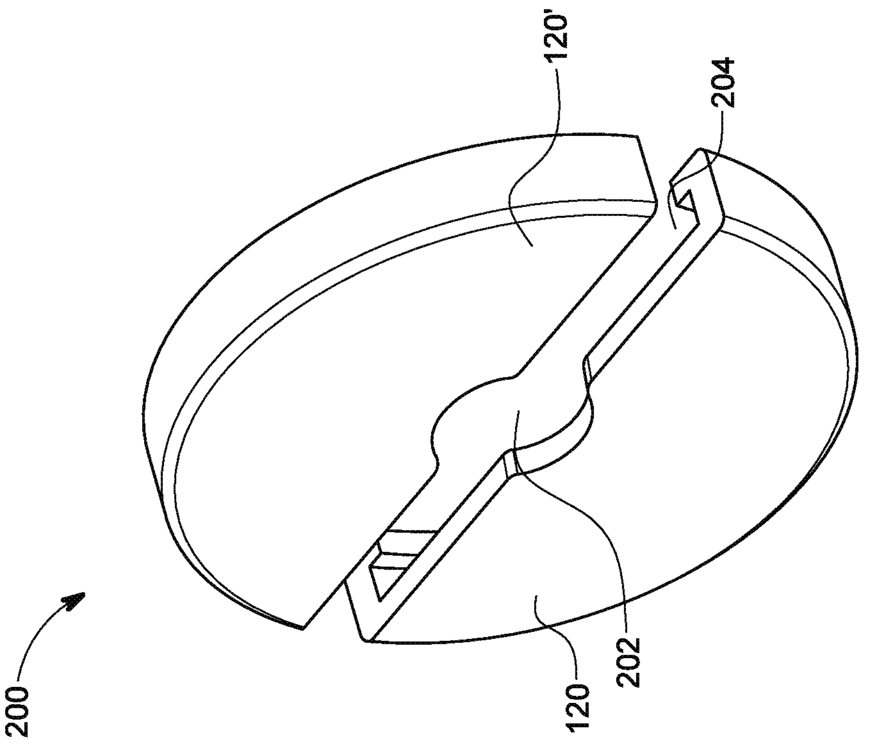
FIG. 2 illustrates a layout of a partitioned lens for the ion source apparatus for a mass spectrometer as shown in FIG. 1, in accordance with an example of the present disclosure.

FIG. 2 illustrates a layout of a partitioned lens 200 for the apparatus 100, in accordance with an example of the present disclosure.

Referring to FIGS. 1 and 2, partitioned lens 200 may include lens partitions 120 and 120'. The lens partitions 120 and 120' may include the partitioned lens insulator mounting spacer 122 (see FIG. 1). In one example, the central opening 202 may include a circular configuration. In another example, the central opening 202 may include an approximately 4 mm diameter. In a further example, the lens partitions 120 and 120' may be separated by an approximately 2 mm linear gap 204 (e.g., the lens partition as disclosed herein).

Figure 3:
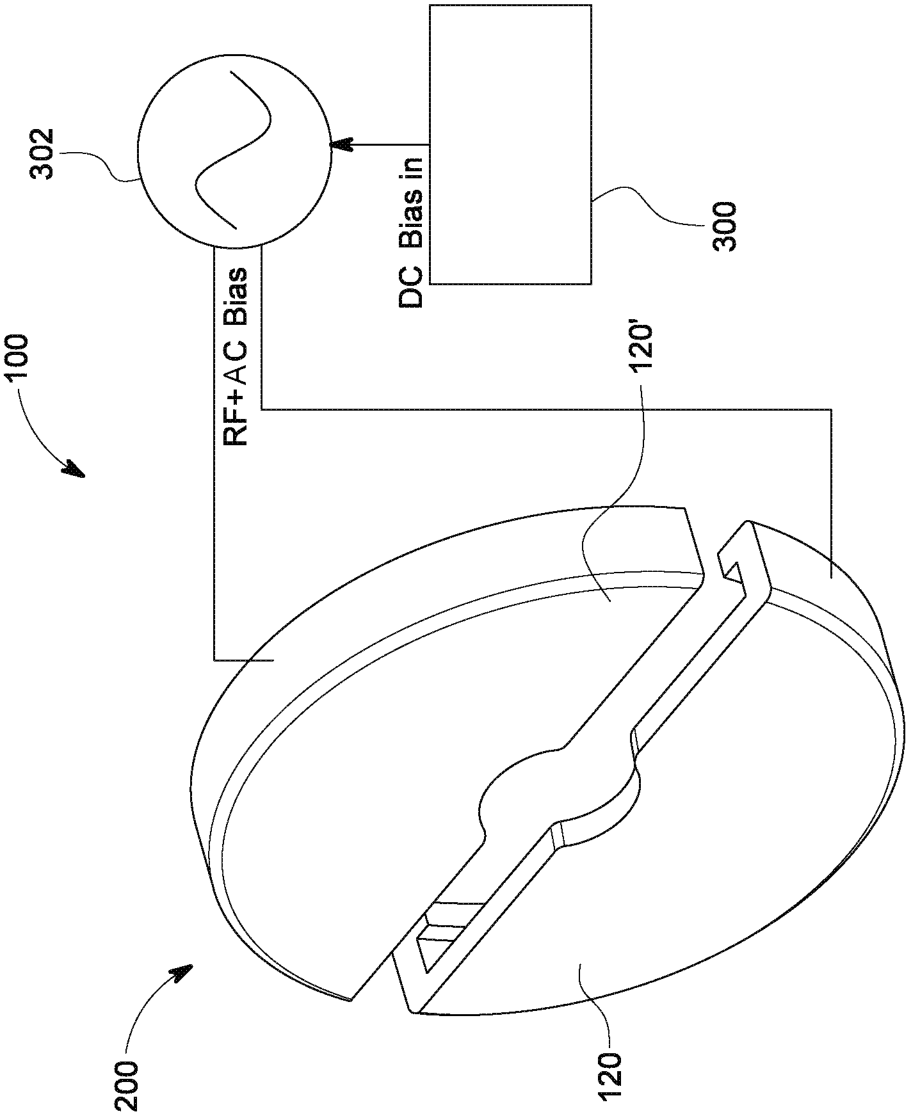
FIG. 3 illustrates further details of the partitioned lens for the ion source apparatus for a mass spectrometer as shown in FIG. 1, in accordance with an example of the present disclosure.

FIG. 3 illustrates further details of the partitioned lens 200 for the apparatus 100, in accordance with an example of the present disclosure.

Referring to FIGS. 1-3, the partitioned lens 200 may be connected to both DC bias power supply 300, and RF AC voltage power supply 302. The RF AC voltage power supply 302 may produce a dipolar RF field within the partitioned lens 200. The DC bias power supply 300 may be connected as a bias to both lens partitions 120 and 120'. While the relatively light ions may be ejected from the ion beam due to the RF field produced by the RF AC voltage power supply 302, the DC bias power supply 300 may be utilized for transmission of the relatively heaver sample ions of interest.

Figure 4:
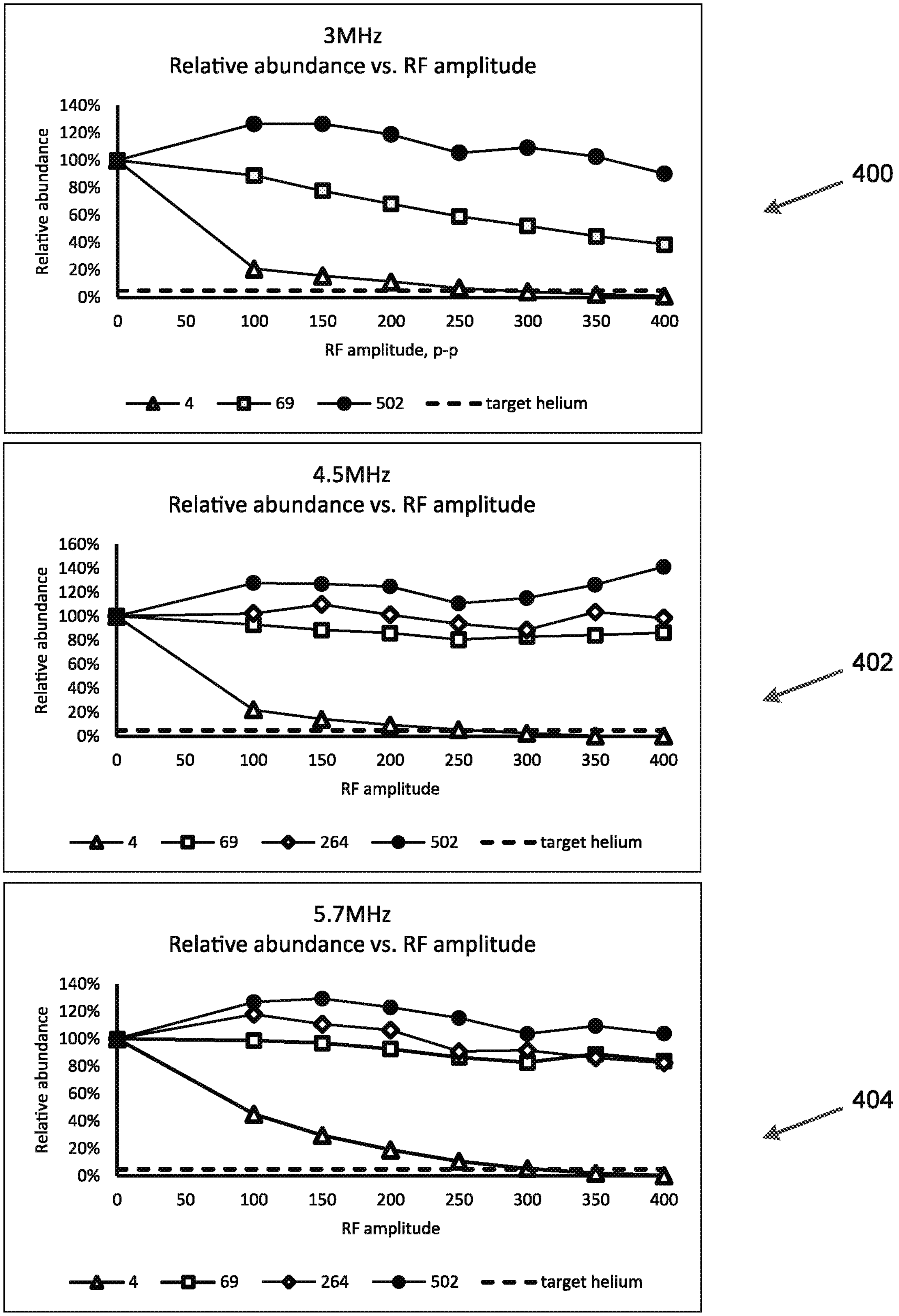
FIG. 4 illustrates relative abundance versus radio frequency (RF) amplitude to illustrate operation of the ion source apparatus for a mass spectrometer as shown in FIG. 1, in accordance with an example of the present disclosure.

FIG. 4 illustrates relative abundance versus radio frequency (RF) amplitude to illustrate operation of the apparatus 100, in accordance with an example of the present disclosure.

Referring to FIGS. 1-4, in one example, the lens RF frequency may be optimized to remove carrier gas ions that are produced by the GC carrier gas while minimizing effects on the transmission of sample ions of interests. In another example, the RF frequency may be optimized to be 4.5 MHz and 300V peak-peak (p-p), where, at these settings, compared to the RF operating frequencies of 3 MHz and 5.7 MHz, at 4.5 MHz, He ions are ejected from the ion beam with a helium target factor of 20× of attenuation at 300 V RF p-p while providing ion transmission for ions of interest within 75 to 125% abundancies. This is because at mass-to-charge ratio (m/z)=4, He ions are not stable within the created dipolar RF field, while trajectories of ions at substantially higher m/z such as above 50 atomic mass units (amu) are nearly undisturbed as they all have a stable trajectory within the partitioned lens 200. As shown in FIG. 4, the transmission curves of different m/z (e.g., m/z=4, 69, 264, 502) through the ion source 150 are shown respectively at 400, 402, and 404 at different RF operating frequencies (e.g., 3 MHZ, 4.5 MHz, and 5.7 MHz). As shown at 400, there is discrimination at m/z=4 and 69, whereas at 402 and 404, there is no substantial discrimination with respect to m/z=69, 264, and 502. The He ions are however discriminated in all three cases as shown at 400, 402, and 404, while the case at 402 is preferred due to the lower RF voltage needed to achieve the same degree of He ion ejection and discrimination as in the case at 404, while still providing little or no discrimination to sample ions in contrast to the case at 400.

Figure 5:
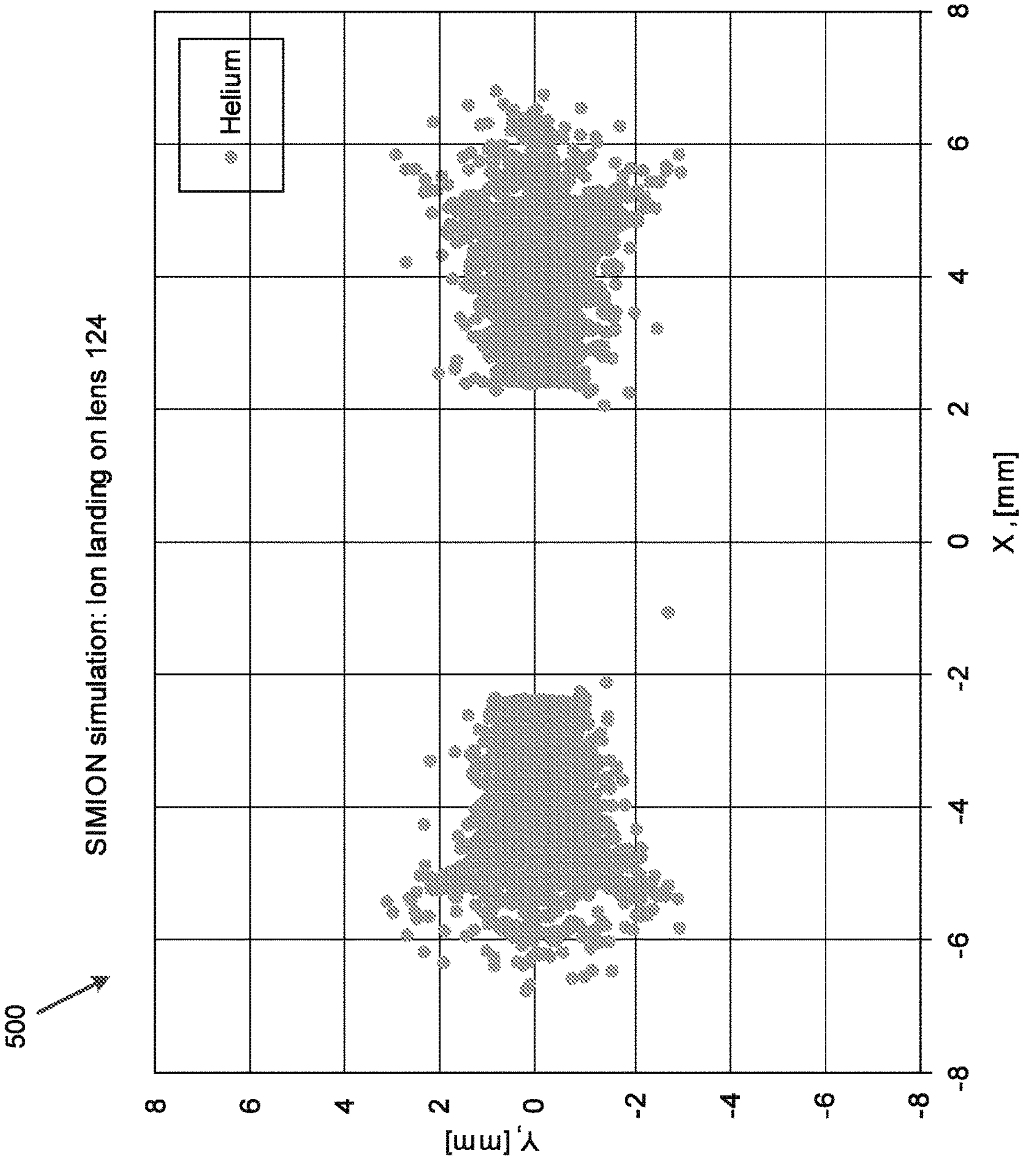
FIG. 5 presents a SIMION simulation to illustrate operation of the ion source apparatus for a mass spectrometer as shown in FIG. 1, in accordance with an example of the present disclosure.

FIG. 5 presents a SIMION (e.g., ion simulation package) simulation 500 to illustrate operation of the apparatus 100, in accordance with an example of the present disclosure.

For the example of FIG. 4, as shown in FIG. 5, the He ions are ejected due to the lens partition (e.g., linear gap 204) with dipolar RF field within it and land primarily on the next lens (e.g., the ion focus lens 124) in the ion optical path. The He ions land in the pattern of two radial areas that are perpendicular to the linear gap as shown from the SIMION simulation 500. The center of the ion beam is at X=0, Y=0 for the simulation 500. Thus, instead of being transmitted, the He ions land primarily on the next lens (e.g., the ion focus lens 124). In this regard, with respect to neutral noise, with respect to an example implementation of the apparatus 100 for single quadrupole systems, neutral noise may be substantially reduced when RF is applied.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:

an ion source including at least one lens, wherein the at least one lens is partitioned by at least one partition into at least two lens partitions, wherein the at least one lens includes an edge portion and a surface that extends from the edge portion towards a central axis of the at least one lens and is transverse to the central axis, and wherein the surface is partitioned by the at least one partition to separate the at least one lens into the at least two lens partitions, wherein the at least two lens partitions are connectable to a direct current (DC) bias power supply to bias the at least two lens partitions and to a radio frequency alternating current (RF AC) voltage power supply to produce a dipolar RF field within the at least one lens.

2. The apparatus according to claim 1, wherein the at least one lens is symmetrically partitioned by the at least one partition into at least two symmetrical lens partitions.

3. The apparatus according to claim 1, wherein the at least one lens is asymmetrically partitioned by the at least one partition into at least two asymmetrical lens partitions.

4. The apparatus according to claim 1, further comprising:

a partitioned lens insulator mounting spacer disposed between the at least one lens and an adjacently disposed further lens.

5. The apparatus according to claim 1, wherein the at least two lens partitions include a central opening in the at least one partition.

6. The apparatus according to claim 5, wherein the central opening is circular.

7. The apparatus according to claim 5, wherein the central opening is non-circular.

8. The apparatus according to claim 1, wherein the at least one lens includes a lowest ion energy compared to at least one other lens of the ion source.

9. A method comprising:

connecting, for an ion source that includes at least one lens including at least two lens partitions, the at least two lens partitions to a direct current (DC) bias power supply to bias the at least two lens partitions and a radio frequency alternating current (RF AC) voltage power supply to produce a dipolar RF field within the at least one lens; and optimizing, for the ion source, a lens RF frequency to remove carrier gas ions that are produced by a gas chromatography (GC) carrier gas.

10. The method according to claim 9, wherein the at least one lens is symmetrically partitioned by at least one partition into at least two symmetrical lens partitions.

11. The method according to claim 9, wherein the at least one lens is asymmetrically partitioned by at least one partition into at least two asymmetrical lens partitions.

12. The method according to claim 9, wherein the at least two lens partitions include a central opening in at least one partition that partitions the at least one lens into the at least two lens partitions.

13. The method according to claim 12, wherein the central opening is circular.

14. The method according to claim 12, wherein the central opening is non-circular.

15. The method according to claim 9, wherein the at least one lens includes a lowest ion energy compared to at least one other lens of the ion source.

16. The method according to claim 9, further comprising:

adjusting an amplitude of an RF AC voltage based on a mass-to-charge ratio (m/z) value for ions of interest to transmit the ions of interest substantially with no discrimination and to remove carrier ions to a target attenuation ratio.

17. An apparatus comprising:

a source including at least one lens, wherein the at least one lens is partitioned by at least one partition into at least two lens partitions, wherein the at least one lens includes an edge portion and a surface that extends from the edge portion towards a central axis of the at least one lens and is transverse to the central axis, and wherein the surface is partitioned by the at least one partition to separate the at least one lens into the at least two lens partitions, wherein the at least two lens partitions are connectable to a radio frequency (RF) drive.

18. The apparatus according to claim 17, wherein the at least two lens partitions are further connectable to a direct current (DC) bias voltage.

19. The apparatus according to claim 17, wherein the RF drive includes a dipole configuration.

20. The apparatus according to claim 17, wherein the at least two lens partitions are connectable to the RF drive to adjust output voltage as a function of mass-to-charge ratio (m/z) for ions of interest.

* * * * *